US 9,274,822 B2

(12) United States Patent
Kruglick

(10) Patent No.: US 9,274,822 B2
(45) Date of Patent: Mar. 1, 2016

(54) REACTIVE LOOP SENSING IN MULTI-DATACENTER DEPLOYMENTS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 23 days.

(21) Appl. No.: 14/238,470

(22) PCT Filed: Apr. 30, 2013

(86) PCT No.: PCT/US2013/038894
§ 371 (c)(1),
(2) Date: Feb. 11, 2014

(87) PCT Pub. No.: WO2014/178850
PCT Pub. Date: Nov. 6, 2014

(65) Prior Publication Data
US 2015/0135176 A1 May 14, 2015

(51) Int. Cl.
*G06F 9/46* (2006.01)
*G06F 15/173* (2006.01)
(Continued)

(52) U.S. Cl.
CPC .............. *G06F 9/45533* (2013.01); *G06F 8/60* (2013.01); *G06F 11/3006* (2013.01); *H04L 43/08* (2013.01); *G06F 8/65* (2013.01); *G06F 9/45558* (2013.01); *H04L 47/70* (2013.01)

(58) Field of Classification Search
CPC .................................. G06F 9/52; H04L 47/70
See application file for complete search history.

(56) References Cited

U.S. PATENT DOCUMENTS

| 6,549,517 | B1 | 4/2003 | Aweya et al. |
| 8,214,474 | B2 | 7/2012 | Chess et al. |

(Continued)

FOREIGN PATENT DOCUMENTS

| WO | 0152095 A2 | 6/2001 |
| WO | 0152095 A2 | 7/2001 |

OTHER PUBLICATIONS

"Graphite—Scalable Realtime Graphing," Graphite, accessed at web.archive.org/web/20130424062942/http://graphite.wikidot.com/, accessed on Dec. 23, 2013, pp. 1-7.

(Continued)

*Primary Examiner* — Camquy Truong
(74) *Attorney, Agent, or Firm* — Turk IP Law, LLC

(57) ABSTRACT

Technologies are generally provided for reactive loop sensing in multi-datacenter deployments. In some examples, tagged metrics from deployment elements on different datacenter or platform providers may be used by a stability module to generate a synthetic generalized deployment model that aliases multiple system elements into general state vectors. The state vectors may include a transfer vector on the border between each datacenter or platform, and the feedback from the metrics may cause the states of the datacenters/platforms to match the deployment's unobserved variables allowing stability analysis before failure. For example, the metrics may be associated with a portion of the deployment on one of the multiple datacenters. The stability analysis module may compare the received metrics with model metrics derived from a model of the multi-datacenter deployment to determine the stability of the deployment and/or adjust the model for increased stability.

20 Claims, 7 Drawing Sheets

(51) Int. Cl.
G06F 9/445 (2006.01)
G06F 9/455 (2006.01)
G06F 11/30 (2006.01)
H04L 12/26 (2006.01)
H04L 12/911 (2013.01)

(56) References Cited

U.S. PATENT DOCUMENTS

| 9,075,687 | B1* | 7/2015 | Liu et al. | |
|---|---|---|---|---|
| 2013/0046887 | A1* | 2/2013 | Malloy et al. | 709/224 |
| 2013/0067181 | A1 | 3/2013 | Boldyrev et al. | |
| 2015/0074679 | A1* | 3/2015 | Fenoglio et al. | 718/104 |

OTHER PUBLICATIONS

"How to detect a combinational feedback loop—verilog," Object Mix, accessed at http://web.archive.org/web/20121012124 13://objectmix.com/verilog/189737-how-detect-combinational-feedback-loop.html, accessed on Dec. 23, 2013, pp. 1-3.
"ITKO's Lisa. The agile platform for composite application development," ITKO, accessed at http://web.archive.org/web/20120217222001/www.itko.com/solutions/lisa.jsp, accessed on Dec. 23, 2013, pp. 1-2.
"Nagios—The Industry Standard in IT Infrastructure Monitoring", http://www.nagios.org/, website Copyright 2009-2014.
"Simple daemon for easy stats aggregation," GitHub, accessed at github.com/etsy/statsd/, accessed on Dec. 23, 2013, pp. 1-3.
"Virtualization & Cloud Management," VMWare, accessed at web.archive.org/web/20120802223422/https://www.vmware.com/solutions/virtualization-management/application-management.html, accessed on Dec. 23, 2013, pp. 1-2.
"Why Boundary," Boundary, accessed at web.archive.org/web/20130420074036/http://boundary.com/why-boundary/, accessed on Dec. 23, 2013, pp. 1-3.
Abdelzaher, T., et al., "Introduction to Control Theory and Its Application to Computing Systems," Performance Modeling and Engineering, pp. 1-33 (2008).
Alizadeh, M., et al., "Data Center Transport Mechanisms: Congestion Control Theory and IEEE Standardization," 46th Annual Allerton Conference on Communication, Control, and Computing, pp. 1270-1277, Sep. 23-26, 2008.
Dutreilh, X., et al., "From Data Center Resource Allocation to Control Theory and Back," IEEE 3rd International Conference on Cloud Computing, pp. 410-417, IEEE (2010).
Griffin, G.G., "The Stable Paths Problem and Interdomain Routing," IEEE/ACM Transactions on Networking, vol. 10, No. 2, pp. 232-243, Apr. 2002.
Gusat, M., et al., "Benchmarking the Ethernet-Federated Datacenter," Research Report, IBM, pp. 10 (Nov. 16, 2009).
Hernandez, P., "IDC: Public Cloud Market to Reach $100B in 2016," Datamation, accessed at http://web.archive.org/web/20121107133812/http://www.datamation.com/cloud-computing/idc-public-cloud-market-to-reach-100b-in-2016.html, Sep. 11, 2012, pp. 1-2.
Losh, S., "Tracking Application-Level Metrics in Amara," Amara labs, accessed at http://web.archive.org/web/20120719082403/http://labs.amara.org/2012-07-16-metrics.html, Jul. 16, 2012, pp. 1-10.
McMillan, R., "Netflix to Open Source Army of Cloud Monkeys," Wired, accessed at http://web.archive.org/web/20121005081946/http://www.wired.com/wiredenterprise/2012/04/netflix_monkeys, Apr. 13, 2012, pp. 1-3.
Miller, R., "NGINX Exec Talks about Netflix CDN Open Server Deal," Correlsense, accessed at http://web.archive.org/web/20121022070644/http://www.real-user-monitoring.com/nginx-exec-talks-about-netflix-cdn-open-server-deal, Jun. 8, 2012, pp. 1-3.
Moore, J.D., "Automated Cost-Aware Data Center Management," Computer Science, pp. 140 (2006).
Rubin, E., "Cloud Federation and the Intercloud," Cloud Computing Journal, accessed at http://cloudcomputing.sys-con.com/node/1249746, Jan. 25, 2010, pp. 1-6.
Varadhan, K., et al., "Persistent route oscillations in interdomain routing," Computer Networks, vol. 32, pp. 1-16, Elsevier Science B.V, Jan. 2000.
Wilhelm, A., "App monitoring tool boundary launches a free tier as it partners up with Engine Yard," Apps, accessed at http://web.archive.org/web/20120918072027/http://thenextweb.com/apps/2012/08/14/real-time-app-monitoring-tool-boundary-launches-free-tier-product-lands-partnership-engine-yard, Aug. 14, 2012, pp. 1-3.
Wood, T., "Improving Data Center Resource Management, Deployment, and Availability With Virtualization," Computer Science, pp. 209 (Sep. 2011).
Kingsbury, "Riemann Monitor Distributed Systems", http://aphyr.github.com/riemann/, 2013.
International Search Report with Written Opinion for International Application No. PCT/US2013/038894 mailed on Nov. 8, 2013.

* cited by examiner

REACTIVE LOOP SENSING IN MULTI-DATACENTER DEPLOYMENTS

CROSS-REFERENCE TO RELATED APPLICATION

This Application is the National Stage filing under 35 U.S.C §371 of PCT Application Ser. No. PCT/US13/38894 filed on Apr. 30, 2013. The PCT Application is herein incorporated by reference in its entirety.

BACKGROUND

Unless otherwise indicated herein, the materials described in this section are not prior art to the claims in this application and are not admitted to be prior art by inclusion in this section.

As cloud services and service providers proliferate, many web applications may actually span multiple applications, services, and datacenters. In many cases, such multiple applications, services, datacenters, and similar entities may implement automation feedback loops to reduce costs, efficiently distribute loads and optimize performance. However, these automation feedback loops may not necessarily be visible to users. In a situation where a web application spans multiple entities (applications, services, and/or datacenters), such automation feedback loops may interact in unexpected and undesirable ways.

SUMMARY

The present disclosure generally describes techniques for reactive loop sensing in multi-datacenter deployments.

According to some examples, a method is provided for stabilizing feedback loops in a multi-entity deployment. The method may include receiving a first metric from a first entity executing a first portion of a deployment, receiving a second metric from a second entity executing a second portion of the deployment, determining a stability parameter of the deployment associated with an interaction between the first entity and the second entity based on the first metric and the second entity, and providing an alert and/or adjusting the deployment based on the stability parameter.

According to other examples, a virtual machine manager (VMM) is provided for stabilizing feedback loops in a multi-entity deployment. The VMM may include a stability module and a processing module. The stability module may be configured to receive a first metric corresponding to a first portion of a deployment being executed by a first entity, receive a second metric corresponding to a second portion of the deployment being executed by a second entity, and determine a stability parameter of the deployment associated with an interaction between the first entity and the second entity based on the first metric and the second metric. The processing module may be configured to provide an alert and/or adjust the deployment based on the stability parameter.

According to further examples, a cloud-based datacenter is provided for stabilizing feedback loops in a multi-entity deployment. The datacenter may include at least one virtual machine (VM) operable to be executed on one or more physical machines and a datacenter controller. The datacenter controller may be configured to receive a first metric from a first portion of a deployment executing on the VM, receive a second metric from another entity executing a second portion of the deployment, determine a stability parameter of the deployment associated with an interaction between the VM and the other entity based on the first metric and the second metric, and provide an alert and/or adjust the deployment based on the stability parameter.

According to yet further examples, a computer readable medium may store instructions for stabilizing feedback loops in a multi-entity deployment. The instructions may include receiving a first metric from a first entity executing a first portion of a deployment, receiving a second metric from a second entity executing a second portion of the deployment, determining a stability parameter of the deployment associated with an interaction between the first entity and the second entity, and providing an alert and/or adjusting the deployment based on the stability parameter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
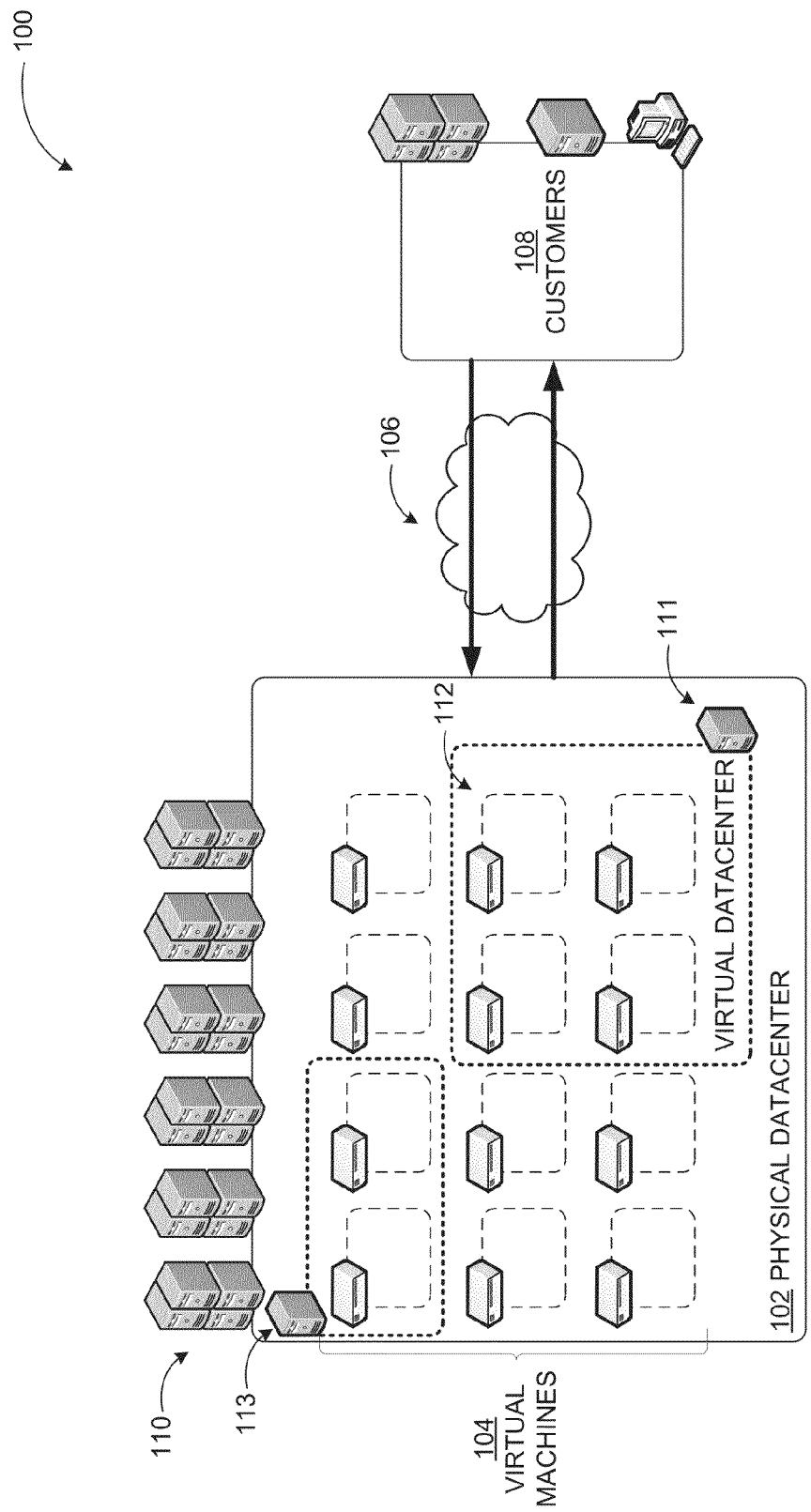
FIG. 1 illustrates an example datacenter-based system where reactive loop sensing in multi-datacenter deployments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to reactive loop sensing in multi-datacenter deployments.

Briefly stated, technologies are generally provided for reactive loop sensing in multi-datacenter deployments. In some examples, tagged metrics from deployment elements on different datacenter or platform providers may be used by a stability module to generate a synthetic generalized deployment model that aliases multiple system elements into general state vectors. The state vectors may include a transfer vector on the border between each datacenter or platform, and the feedback from the metrics may cause the states of the modeled datacenters/platforms to match the deployment's unobserved variables (e.g., inter-datacenter interactions and gains) allowing stability analysis before failure. For example, the metrics may be associated with a portion of the deployment on one of the multiple datacenters. The stability analysis module may compare the received metrics with model metrics derived from a model of the multi-datacenter deployment to determine the stability of the deployment and/or adjust the model for increased accuracy.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations where each service provider would execute their applications and have their users access those applications on the retail service's own servers physically located on retail service premises. One result of the networked approach described herein is that customers like the retail service may move their hosted services/applications from one datacenter to another without the users noticing a difference.

FIG. 1 illustrates an example datacenter-based system where reactive loop sensing in multi-datacenter deployments may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

In some embodiments, a synthetic generalized deployment model may be generated by the system using metrics from deployment elements on different datacenters providers. The model may alias multiple system elements into general state vectors, which may include a transfer vector on the border between each datacenter. A transfer vector is the coefficient of feedback that describes how the states on one side of a multi-datacenter deployment influence the states on another side. Results from the metrics may be used to adjust the states of the datacenters to increase stability and reduce failure. In contrast, conventional analysis systems either may not detect resonance conditions or detect them for systems where all loops and policies are known and controlled. Example systems according to embodiments may provide the ability to manage feedback across arbitrary federated datacenter domains servers.

Figure 2:
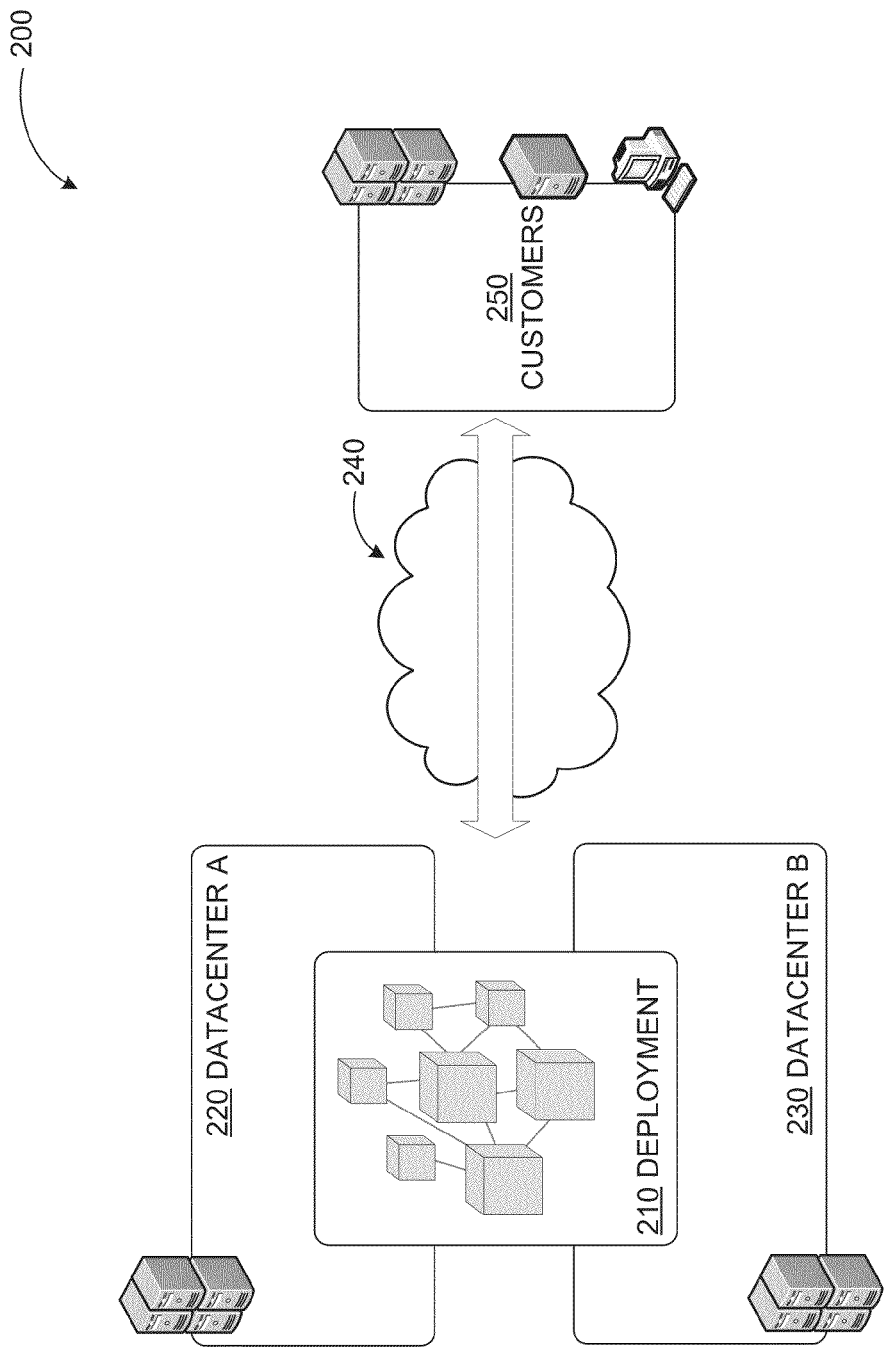
FIG. 2 illustrates an example datacenter-based system having multi-datacenter deployment.

FIG. 2 illustrates an example datacenter-based system having multi-datacenter deployment, arranged in accordance with at least some embodiments described herein.

As shown in a diagram 200, a customer deployment 210 (e.g., a customer service or application) may provide data or computing services to a group of customers 250, similar to the customers 108 in FIG. 1, via a network 240. In some embodiments, the customer deployment 210 may be implemented across multiple datacenters. For example, the customer deployment 210 may be implemented across a datacenter A 220 and a datacenter B 230, both of which may be similar to the physical datacenter 102 in FIG. 1. In some embodiments, the customer deployment 210 may be implemented on one or more virtual machines in the datacenter A 220 and also on one or more virtual machines in the datacenter B 230. While the customer deployment 210 is shown as being implemented on two datacenters, the datacenter A 220 and the datacenter B 230, in other embodiments a customer deployment may be implemented on more than two datacenters.

Figure 3:
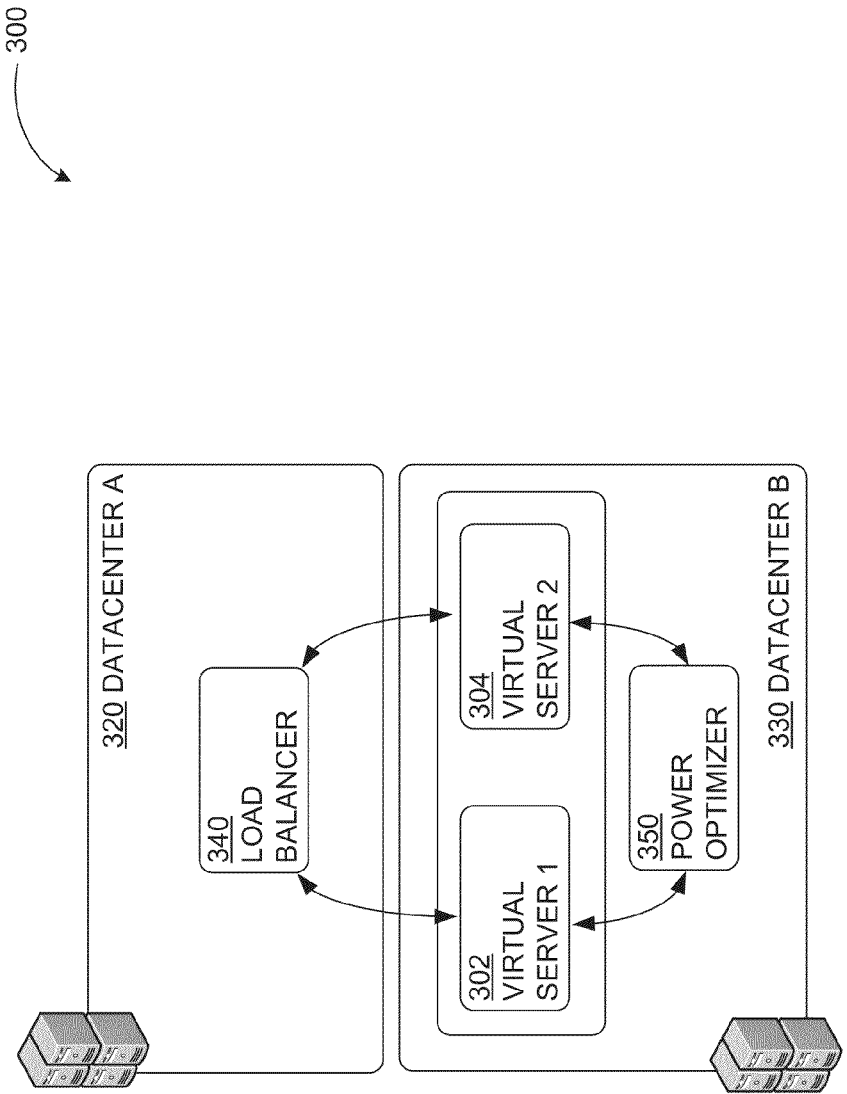
FIG. 3 illustrates an example multi-datacenter deployment with feedback loops.

FIG. 3 illustrates an example multi-datacenter deployment with feedback loops, arranged in accordance with at least some embodiments described herein.

As shown in a diagram 300, a deployment may be implemented across a datacenter A 320 (similar to the datacenter A 220) and a datacenter B 330 (similar to the datacenter B 230). In particular, the datacenter A 320 may be an application provider and host a load balancer 340 while the datacenter B 330 may be an infrastructure provider and host a power optimizer 350 as well as a virtual server 1 302 and a virtual server 2 304. The virtual server 1 302 and the virtual server 2 304 may be similar to the virtual machines 104 in FIG. 1. The load balancer 340 located at the datacenter A 320 may dynamically distribute incoming requests to the deployment (e.g., from customers such as the customers 250) between the virtual server 1 302 and the virtual server 2 304 in order to balance the load between the two virtual servers located on the infrastructure datacenter. The loop in the diagram 300 may be unstable because the load balancer 340 is separate from the power optimizer 350.

In some embodiments, the load balancer 340 may operate in a control loop associated with a time period. After each time period, the load balancer 340 may evaluate and compare the current loads of the virtual server 1 302 and the virtual server 2 304 based on server response time statistics during the previous time period. Based on the evaluation and comparison, in the next time period the load balancer 340 may then redistribute more of the incoming requests to the virtual server with less load.

The power optimizer 350 located at the datacenter B 330 may dynamically adjust the power and operating speed of the virtual server 1 302 and the virtual server 2 304 based on server load in order to decrease power consumption and increase efficiency. As with the load balancer 340, the power optimizer 350 may also operate in a control loop associated with a time period. After each time period, the power optimizer 350 may measure the current loads of the virtual server 1 302 and the virtual server 2 304 based on, for example, processor core utilization during the previous time period. Based on the load measurement, in the next or subsequent time period, the power optimizer 350 may reduce the power and/or operating speed of a server with or having less load, and increase the power and/or operating speed of a server with or having more load.

While the control loops of the load balancer 340 and the power optimizer 350 may be individually stable, when combined they may form an unstable positive feedback loop, especially if their associated time periods are similar. For example, supposing that the time periods associated with the load balancer 340 and the power optimizer 350 control loops are both approximately the same, their endpoints may be relatively closely aligned. At the end of one time period, the load balancer 340 may detect that the virtual server 2 304 has a slightly higher load than the virtual server 1 302, and may subsequently redistribute more load from the virtual server 2 304 to the virtual server 1 302 in the next time period. However, the power optimizer 350, upon detecting that the virtual server 2 304 has a slightly higher load than the virtual server 1 302, may subsequently increase the operating speed/power of the virtual server 2 304 while reducing the operating speed/power of the virtual server 1 302 in the next time period. As a result, in the next time period, the virtual server 1 302 may have more load (due to the load balancer 340) but decreased operating speed/power (due to the power optimizer 350), whereas the virtual server 2 304 may have less load and increased operating speed/power. Upon detecting this situation, the load balancer 340 may then shift load back to the virtual server 2 304, whereas the power optimizer 350 may decrease the operating speed/power of the virtual server 2 304. In some embodiments, this interaction may cause overcompensation, where the load balancer 340 and the power optimizer 350 cause larger and larger swings in load distribution and operating speed/power between the virtual server 1 302 and the virtual server 2 304. This positive feedback loop may eventually lead to large oscillations, potentially causing system instability and failure. As such, the ability to detect and respond to unstable feedback loops in multi-datacenter deployments may be desirable.

Figure 4:
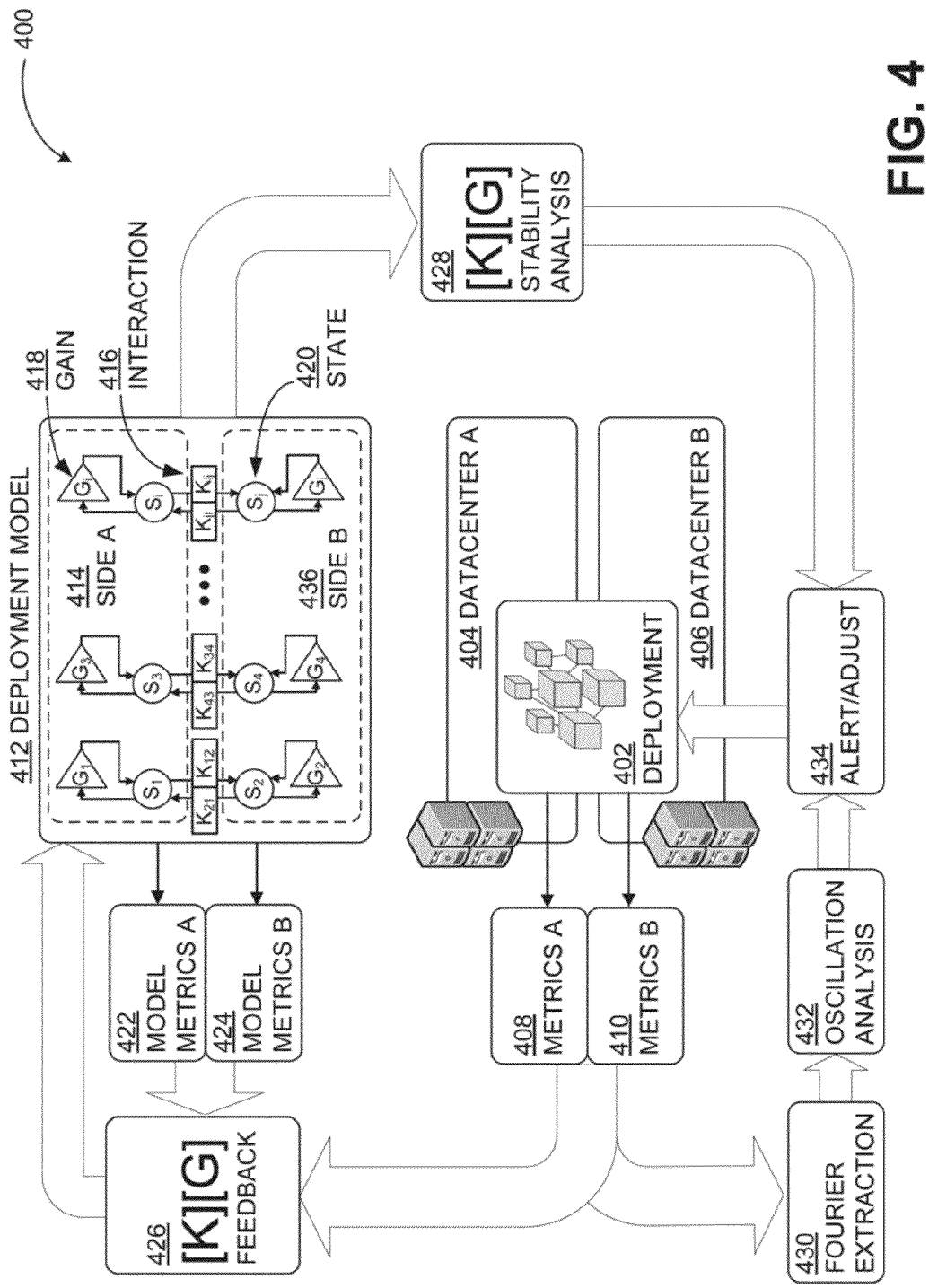
FIG. 4 illustrates an example virtual machine manager implementing reactive loop sensing in multi-datacenter deployments.

FIG. 4 illustrates an example virtual machine manager implementing reactive loop sensing in multi-datacenter deployments, arranged in accordance with at least some embodiments described herein.

As shown in a diagram 400, a deployment 402 (similar to the customer deployment 210) may be implemented across a datacenter A 404 (similar to the datacenter A 220) and a datacenter B 406 (similar to the datacenter B 230). The deployment 402 may generate metrics A 408 specifically associated with the datacenter A 404 and metrics B 410 specifically associated with the datacenter B. In some embodiments, the metrics A 408 and the metrics B 410 may be associated with physical servers (e.g., the physical servers 111 and 113) and/or virtual machines (e.g., the virtual machines 104), and may include load, performance, speed, and/or power consumption.

The metrics A 408 and the metrics B 410 may then be compared with model metrics A 422 and model metrics B 424 generated from a generalized deployment model 412. The generalized deployment model 412 may be configured to model the performance of the deployment 402, and in this instance may include a side A 414 (corresponding to the datacenter A 404) and a side B 436 (corresponding to the datacenter B 406). For example, each side may include a number of model states S 420 and gains G 418 modeling the behavior of the datacenters implementing the deployment 402. In some embodiments, one or more of the model states S 420 may directly correspond to the model metrics A 422 and the model metrics B 424. The deployment model 412 may further include interaction terms K 416 in the form of a transfer vector that represent interactions between the datacenters implementing the deployment 402 (i.e., the datacenter A 404 and the datacenter B 406). In some embodiments, the gains G 418 and the interaction terms K 416 may result from the interaction of automation processes and feedback loops in the different datacenters, and as such may represent parameters that may not be directly observed in the actual deployment 402. In some embodiments, the generalized deployment model 412 may implement a generalized tree model and/or a generalized mesh model. A system may be referred to as being observable if, for any possible sequence of state and control vectors, a current state can be determined in finite time using the outputs. Thus, it may be possible to determine a behavior of an entire system from the system's outputs.

As mentioned above, the metrics A 408 and the metrics B 410 may be compared with the model metrics A 422 and the model metrics B 424 generated from the deployment model 412. The comparison may be performed by a feedback module 426, which may use the comparison results to refine the gains G 418 and the interaction terms K 416 such that the behavior of the deployment model 412 more closely matches the behavior of the deployment 402. In some embodiments, the feedback module 426 may also use the comparison results to refine the model states S 420. In some embodiments, the metric comparison and feedback may be implemented using Kalman filtering (or linear quadratic estimation).

A stability analysis module 428 may then assess the stability of the deployment model 412 (and the actual deployment 402 which the deployment model 412 models). For example, the stability analysis module 428 may analyze the gains G 418 and the interaction terms K 416 of the deployment model 412 to determine a stability parameter associated with the deployment 402. In some embodiments, the stability analysis module 428 may use stability analysis techniques such as the Routh-Hurwitz stability criterion, the Nyquist stability criterion, root locus analysis, or any other suitable stability analysis technique. The stability analysis module 428 may also compare the determined stability parameter(s) with predefined and/or dynamically determined thresholds to evaluate stability.

A transfer vector is the coefficient of feedback that describes how the states on side A of the multi-datacenter deployment influence the states on side B. In the diagram 400, K21 (the transfer between state 2 and state 1), K12 (from state 1 to state 2), etc. form the transfer vector. The states S may be measurable but the K values in the transfer vector may not be. Thus, the transfer vector is what is being computed using feedback (the K vector in the feedback module 426). K may also be used in the stability analysis module 428 for the stability analysis. In addition to being a vector, the transfer vector may be realized as a list of terms each of which may for example simply be a real or complex number or a polynomial transfer function (e.g., K12 may be $2s^2-3s+1$).

Based on the results of the stability analysis, the stability analysis module 428 may then cause an alert/adjustment module 434 to issue alerts regarding the stability of the deployment 402 and/or adjust the deployment 402 to reduce potential instability. For example, the alert/adjustment module 434 may be configured to provide alerts to the owners of the deployment 402 and/or the datacenters if instability is detected. In some embodiments, the alert/adjustment module 434 may provide an application programming interface (API) which other automation systems may call on to determine if their automation feedback loop(s) appear to conflict with loops in the deployment 402 and/or the datacenters.

The alert/adjustment module 434 may also be configured to adjust the deployment 402 by modifying timing and/or load distribution. For example, the alert/adjustment module 434 may adjust the time period and/or magnitude for one or more automation feedback loops associated with the deployment 402. The alert/adjustment module 434 may be configured to dither the timing of automation feedback loops by adding randomness in order to decrease the likelihood that the feedback loops will combine to form an unstable positive feedback loop. In some embodiments, the alert/adjustment module 434 may also be configured to adjust the load distribution between the datacenters implementing the deployment 402 and/or the amount of work actually sent to each datacenter.

In some embodiments, instead of (or in addition to) comparing the metrics A 408 and the metrics B 410 to model metrics generated by a deployment model (e.g., the deployment model 412), a Fourier extraction module 430 may be used to process the metrics. Specifically, the Fourier extraction module 430 may detect the oscillations of parameters within the deployment 402 based on the metrics A 408 and the metrics B 410. Such parameters may include load or performance (e.g., speed and/or power consumption) parameters associated with physical servers and/or virtual machines in the datacenter A 404 and/or the datacenter B 406. Once oscillating parameters have been detected, an oscillation analysis module 432 may determine whether the oscillations are increasing in magnitude and/or frequency. Based on the results of the oscillation analysis, the oscillation analysis module 432 may then cause the alert/adjustment module 434 to issue alerts regarding the stability of the deployment 402 and/or adjust the deployment 402 to reduce potential instability, similar to the stability analysis module 428 described above.

While the example deployment 402 is described as being implemented across two different datacenters (i.e., the datacenter A 404 and the datacenter B 406), and the deployment model 412 includes sides corresponding to the different datacenters, this need not necessarily be the case. In some embodiments, a deployment may be implemented across different entities, such as different applications executing on the same or different datacenters or different services executing on the same or different datacenters. Moreover, the deployment and the deployment model may include more than two entities. Regardless of the number and types of entities included in a deployment or deployment model, the stability/oscillation analysis techniques described above may still be applicable. For example, a deployment model may include and model interactions between a "side" corresponding to a datacenter and another "side" corresponding to an application or service implemented on that datacenter. A deployment model with multiple entities may model their interactions with multiple transfer vectors, as described above.

Figure 5:
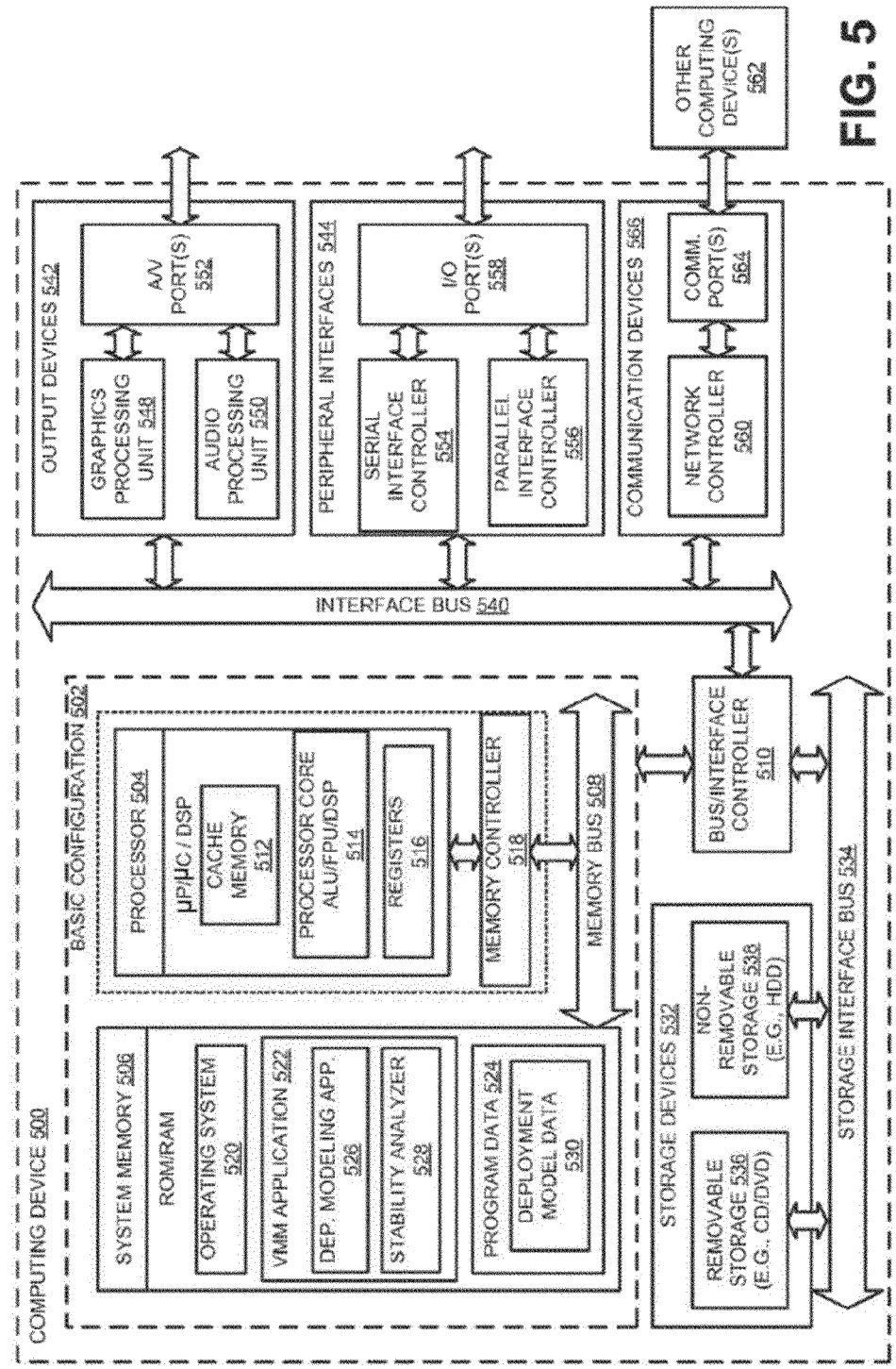
FIG. 5 illustrates a general purpose computing device, which may be used to provide reactive loop sensing in multi-datacenter deployments.

FIG. 5 illustrates a general purpose computing device, which may be used to provide reactive loop sensing in multi-datacenter deployments, arranged in accordance with at least some embodiments described herein.

For example, the computing device 500 may be used to provide reactive loop sensing in multi-datacenter deployments as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtual machine manager (VMM) application 522, and program data 524. The VMM application 522 may include a deployment modeling application 526 and a stability analyzer 528 for providing reactive loop sensing in multi-datacenter deployments as described herein. The program data 524 may include, among other data, deployment model data 530 or the like, as described herein.

In some embodiments, a central management system (e.g., one or more applications executed on one or more other computing devices) may perform actions associated with stabilizing feedback loops in a multi-entity deployment such as receiving a first metric from a first entity executing a first portion of a deployment, receiving a second metric from a second entity executing a second portion of the deployment, determining a stability parameter of the deployment associated with an interaction between the first entity and the second entity based on the first metric and the second entity, and providing an alert and/or adjusting the deployment based on the stability parameter. The central management system may then provide instructions to the VMM application 522 for implementing the feedback loop stabilization.

The computing device 500 may have additional features or functionality, and additional interfaces to facilitate communications between the basic configuration 502 and any desired devices and interfaces. For example, a bus/interface controller 510 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 510. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for preventing network tomography in software-defined datacenter networks. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
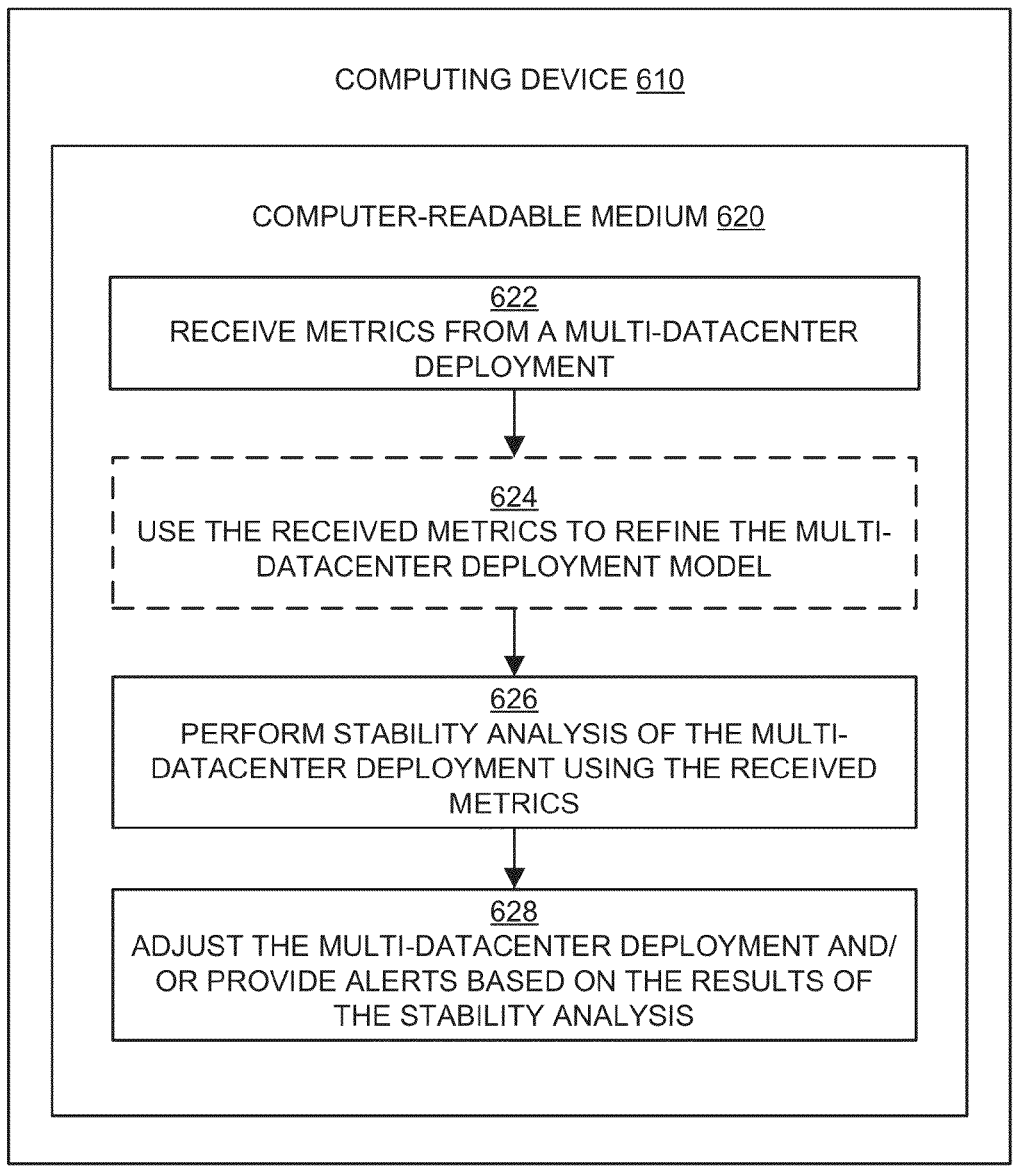
FIG. 6 is a flow diagram illustrating an example method for reactive loop sensing in multi-datacenter deployments that may be performed by a computing device such as the computing device in FIG. 5.

FIG. 6 is a flow diagram illustrating an example method for reactive loop sensing in multi-datacenter deployments that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for reactive loop sensing in multi-datacenter deployments may begin with block 622, "RECEIVE METRICS FROM A MULTI-DATACENTER DEPLOYMENT", where metrics associated with the datacenters that implement a deployment (e.g., the datacenter A 404 and the datacenter B 406) may be received from the datacenters and/or the deployment at a model feedback module (e.g., the feedback module 426), as described above in relation to FIG. 4. As mentioned, these metrics may be associated with physical and/or virtual machines, and may include indications of load, performance, speed, and/or power consumption.

In some embodiments, block 622 may be followed by optional block 624, "USE THE RECEIVED METRICS TO REFINE THE MULTI-DATACENTER DEPLOYMENT MODEL", where the feedback module 426 may use the metrics received in block 622 to refine a model (e.g., the deployment model 412) of the deployment. In some embodiments, as described above, the feedback module may compare the metrics received from the deployment with model metrics generated from the deployment model. The feedback module 426 may then use the comparison results to adjust the model (e.g., the gains G 418 and/or the interaction terms K 416) to more closely reflect the actual deployment.

Block 622 (or optional block 624 if present) may be followed by block 626, "PERFORM STABILITY ANALYSIS OF THE MULTI-DATACENTER DEPLOYMENT USING THE RECEIVED METRICS", where a stability analysis module (e.g., the stability analysis module 428) and/or an oscillation analysis module (e.g., the oscillation analysis module 432) may analyze the received metrics and/or model parameters to determine one or more stability parameters associated with the deployment, as described above.

Finally, block 626 may be followed by block 628, "ADJUST THE MULTI-DATACENTER DEPLOYMENT AND/OR PROVIDE ALERTS BASED ON THE RESULTS OF THE STABILITY ANALYSIS", where an alert/adjustment module (e.g., the alert/adjustment module 434) may be configured to provide alerts and/or adjust the deployment based on the stability parameter(s) determined in block 626, as described above.

Figure 7:
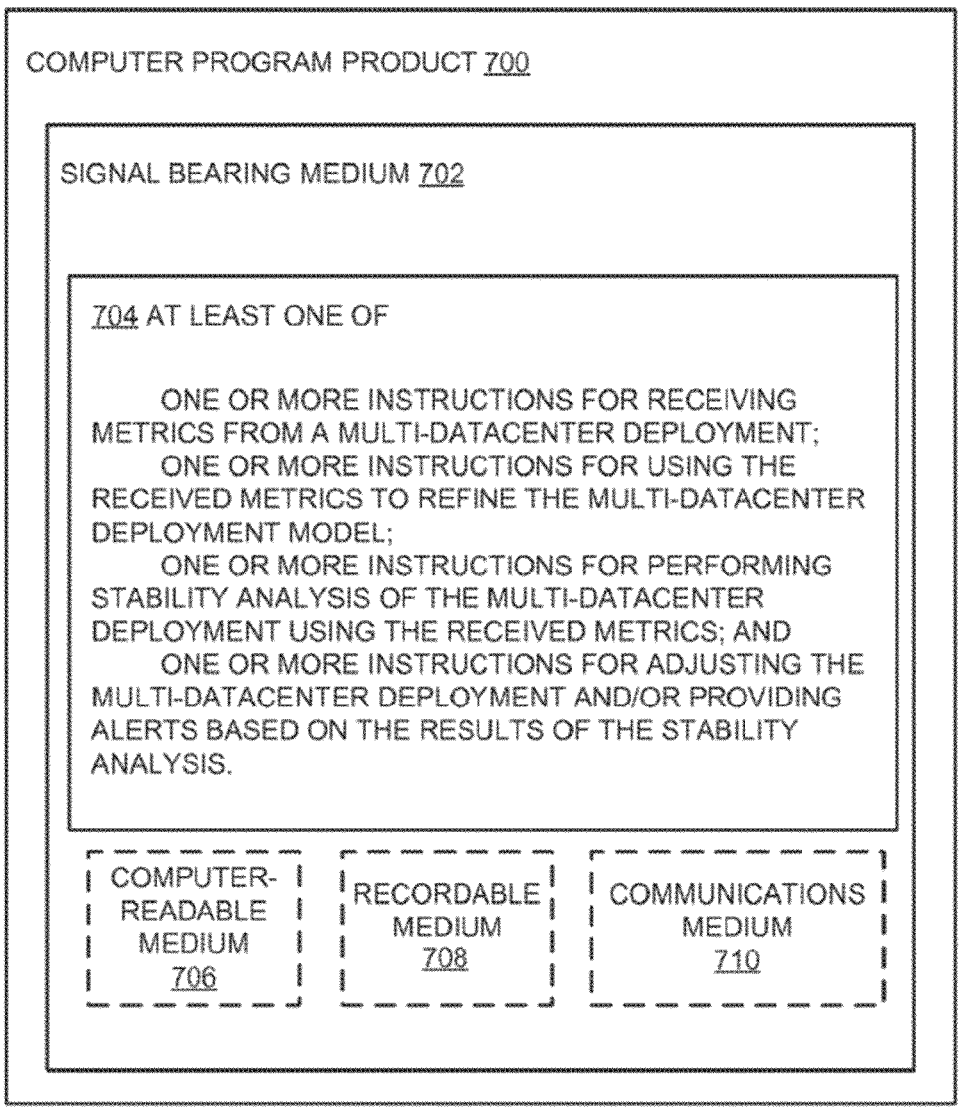
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the scale-out service may undertake one or more of the tasks shown in FIG. 7 in response to the instructions 704 conveyed to the processor 504 by the signal bearing medium 702 to perform actions associated with reactive loop sensing in multi-datacenter deployments as described herein. Some of those instructions may include, for example, receiving metrics from a multi-datacenter deployment, using the received metrics to refine the multi-datacenter deployment model, performing stability analysis of the multi-datacenter deployment using the received metrics and/or model parameters, and/or adjusting the multi-datacenter deployment and/or providing alerts based on the results of the stability analysis, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for stabilizing feedback loops in a multi-entity deployment may include receiving a first metric from a first entity executing a first portion of a deployment, receiving a second metric from a second entity executing a second portion of the deployment, determining a stability parameter of the deployment associated with an interaction between the first entity and the second entity based on the first metric and the second entity, and providing an alert and/or adjusting the deployment based on the stability parameter.

According to some embodiments, the first entity may be a datacenter, an application executing at a datacenter, or a service executing at a datacenter. The method may further include generating a synthetic generalized model of the deployment, using the model to determine a first model metric corresponding to the first metric, using the model to determine a second model metric corresponding to the second metric, comparing the first model metric with the first metric and the second model metric with the second metric, updating the model based on the comparison, and determining the stability parameter based on the model. The synthetic generalized model may include a transfer vector representing the interaction between the first entity and the second entity. The method may further include implementing a Kalman filter with the synthetic generalized model and/or including a generalized tree model and/or a generalized mesh model in the synthetic generalized model.

According to other embodiments, the method may further include determining the stability parameter based on a Routh-Hurwitz stability criterion, a Nyquist stability criterion, and/or a root locus analysis. The stability parameter may include an oscillation frequency and/or an oscillation amplitude of a deployment parameter, and the method may further include comparing the stability parameter to a predefined threshold. The deployment parameter may include a load on the first entity, a load on the second entity, a performance of the first entity, and/or a performance of the second entity. The method may further include determining the stability parameter based on a Fourier extraction.

According to further embodiments, the method may further include adjusting the deployment based on the stability parameter by adjusting a time period for automation feedback, a magnitude for automation feedback, a timing dithering for automation feedback, a load distribution for the first entity and the second entity, an amount of work to be sent to the first entity, and/or an amount of work to be sent to the second entity. The method may further include offering an application programming interface (API) for determining whether another automation feedback loops conflicts with the deployment.

According to other examples, a virtual machine manager (VMM) configured to stabilize feedback loops in a multi-entity deployment may include a stability module and a processing module. The stability module may be configured to receive a first metric corresponding to a first portion of a deployment being executed by a first entity, receive a second metric corresponding to a second portion of the deployment being executed by a second entity, and determine a stability parameter of the deployment associated with an interaction between the first entity and the second entity based on the first metric and the second metric. The processing module may be configured to provide an alert and/or adjust the deployment based on the stability parameter.

According to some embodiments, the first entity may be a datacenter, an application executing at a datacenter, or a service executing at a datacenter. The processing module may be further configured to generate a synthetic generalized model of the deployment, and the stability analysis module may be further configured to use the model to determine a first model metric corresponding to the first metric, use the model to determine a second model metric corresponding to the second metric, compare the first model metric with the first metric and the second model metric with the second metric, and determine the stability parameter based on the model. The processing module may be further configured to update the model based on the comparison. The synthetic generalized model may include a transfer vector representing the interaction between the first entity and the second entity, be used to implement a Kalman filter, and/or include a generalized tree model and/or a generalized mesh model.

According to other embodiments, the stability analysis module may be further configured to determine the stability parameter based on a Routh-Hurwitz stability criterion, a Nyquist stability criterion, and/or a root locus analysis. The stability parameter may include an oscillation frequency and/or an oscillation amplitude of a deployment parameter, and the method may further include comparing the stability parameter to a predefined threshold. The deployment parameter may include a load on the first entity, a load on the second entity, a performance of the first entity, and/or a performance of the second entity. The stability analysis module may be further configured to determine the stability parameter based on a Fourier extraction.

According to further embodiments, the processing module may be further configured to adjust the deployment based on the stability parameter by adjusting a time period for automation feedback, a magnitude for automation feedback, a timing dithering for automation feedback, a load distribution for the first entity and the second entity, an amount of work to be sent to the first entity, and/or an amount of work to be sent to the second entity. The processing module may be further configured to offer an application programming interface (API) for determining whether another automation feedback loops conflicts with the deployment.

According to further examples, a cloud-based datacenter configured to stabilize feedback loops in a multi-entity deployment may include at least one virtual machine (VM) operable to be executed on one or more physical machines and a datacenter controller. The datacenter controller may be configured to receive a first metric from a first portion of a deployment executing on the VM, receive a second metric from another entity executing a second portion of the deployment, determine a stability parameter of the deployment associated with an interaction between the VM and the other entity based on the first metric and the second metric, and provide an alert and/or adjust the deployment based on the stability parameter.

According to some embodiments, the other entity may be another datacenter, an application executing at another datacenter, or a service executing at another datacenter. The datacenter controller may be further configured to generate a synthetic generalized model of the deployment, use the model to determine a first model metric corresponding to the first metric, use the model to determine a second model metric corresponding to the second metric, compare the first model metric with the first metric and the second model metric with the second metric, update the model based on the comparison, and determine the stability parameter based on the model. The synthetic generalized model may include a transfer vector representing the interaction between the VM and the other entity, be used to implement a Kalman filter, and/or include a generalized tree model and/or a generalized mesh model.

According to other embodiments, the datacenter controller may be further configured to determine the stability parameter based on a Routh-Hurwitz stability criterion, a Nyquist stability criterion, and/or a root locus analysis. The stability parameter may include an oscillation frequency and/or an oscillation amplitude of a deployment parameter, and the datacenter controller may be further configured to compare the stability parameter to a predefined threshold. The deployment parameter may include a load on the VM, a load on the other entity, a performance of the VM, and/or a performance of the other entity. The stability analysis module may be further configured to determine the stability parameter based on a Fourier extraction.

According to further embodiments, the datacenter controller may be further configured to adjust the deployment based on the stability parameter by adjusting a time period for automation feedback, a magnitude for automation feedback, a timing dithering for automation feedback, a load distribution for the VM and the other entity, an amount of work to be sent to the VM, and/or an amount of work to be sent to the other entity. The datacenter controller may be further configured to offer an application programming interface (API) for determining whether another automation feedback loops conflicts with the deployment.

According to yet further examples, a computer readable storage medium may store instructions which when executed on one or more computing devices execute a method for stabilizing feedback loops in a multi-entity deployment. The method may include receiving a first metric from a first entity executing a first portion of a deployment, receiving a second metric from a second entity executing a second portion of the deployment, determining a stability parameter of the deployment associated with an interaction between the first entity and the second entity, and providing an alert and/or adjusting the deployment based on the stability parameter.

According to some embodiments, the first entity may be a datacenter, an application executing at a datacenter, or a service executing at a datacenter. The method may further include generating a synthetic generalized model of the deployment, using the model to determine a first model metric corresponding to the first metric, using the model to determine a second model metric corresponding to the second metric, comparing the first model metric with the first metric and the second model metric with the second metric, updating the model based on the comparison, and determining the stability parameter based on the model. The synthetic generalized model may include a transfer vector representing the interaction between the first entity and the second entity. The method may further include implementing a Kalman filter with the synthetic generalized model and/or including a generalized tree model and/or a generalized mesh model in the synthetic generalized model.

According to other embodiments, the method may further include determining the stability parameter based on a Routh-Hurwitz stability criterion, a Nyquist stability criterion, and/or a root locus analysis. The stability parameter may include an oscillation frequency and/or an oscillation amplitude of a deployment parameter, and the method may further include comparing the stability parameter to a predefined threshold. The deployment parameter may include a load on the first entity, a load on the second entity, a performance of the first entity, and/or a performance of the second entity. The method may further include determining the stability parameter based on a Fourier extraction.

According to further embodiments, the method may further include adjusting the deployment based on the stability parameter by adjusting a time period for automation feedback, a magnitude for automation feedback, a timing dithering for automation feedback, a load distribution for the first entity and the second entity, an amount of work to be sent to the first entity, and/or an amount of work to be sent to the second entity. The method may further include offering an application programming interface (API) for determining whether another automation feedback loops conflicts with the deployment.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to stabilize feedback loops in a multi-entity deployment, the method comprising:
   receiving a first metric from a first entity executing a first portion of a deployment;
   receiving a second metric from a second entity executing a second portion of the deployment;
   generating a synthetic generalized model of the deployment;
   using the model to determine a first model metric corresponding to the first metric;
   using the model to determine a second model metric corresponding to the second metric;
   comparing the first model metric with the first metric and the second model metric with the second metric;
   updating the model based on the comparison;
   determining, based on the model, a stability parameter of the deployment associated with an interaction between the first entity and the second entity, wherein the stability parameter includes one or more of an oscillation frequency and an oscillation amplitude of a deployment parameter; and
   one or more of providing an alert and adjusting the deployment based on the stability parameter.

2. The method of claim 1, wherein the synthetic generalized model includes a transfer vector representing the interaction between the first entity and the second entity.

3. The method of claim 1, further comprising implementing a Kalman filter with the synthetic generalized model.

4. The method of claim 1, further comprising including one or more of a generalized tree model and a generalized mesh model in the synthetic generalized model.

5. The method of claim 1, further comprising determining the stability parameter based on one or more of a Routh-Hurwitz stability criterion, a Nyquist stability criterion, and a root locus analysis.

6. The method of claim 1, further comprising comparing the stability parameter to a predefined threshold.

7. The method of claim 1, wherein the deployment parameter includes one or more of a load on the first entity, a load on the second entity, a performance of the first entity, and a performance of the second entity.

8. The method of claim 1, further comprising adjusting the deployment based on the stability parameter by adjusting one or more of:
   a time period for automation feedback,
   a magnitude for automation feedback,
   a timing dithering for automation feedback,
   a load distribution for the first entity and the second entity,
   an amount of work to be sent to the first entity, and
   an amount of work to be sent to the second entity.

9. A server configured to provide a virtual machine manager (VMM) to stabilize feedback loops in a multi-entity deployment, the server comprising:
   a memory configured to store instructions associated with the VMM;
   one or more processors coupled to the memory, the one or more processors configured to execute the VMM in conjunction with the instructions stored in the memory, wherein the VMM includes:
     a processing module configured to:
       generate a synthetic generalized model of the deployment; and
       one or more of: provide an alert and adjust the deployment based on a stability parameter; and
     a stability analysis module configured to:
       receive a first metric corresponding to a first portion of a deployment, the first portion being executed by a first entity;
       receive a second metric corresponding to a second portion of the deployment, the second portion being executed by a second entity;
       use the model to determine a first model metric corresponding to the first metric;
       use the model to determine a second model metric corresponding to the second metric;
       compare the first model metric with the first metric and the second model metric with the second metric;
       determine, based on the model, the stability parameter of the deployment associated with an interaction between the first entity and the second entity, wherein the stability parameter includes one or more of an oscillation frequency and an oscillation amplitude of a deployment parameter.

10. The server of claim 9, wherein the first entity is one of a datacenter, an application executing at a datacenter, and a service executing at a datacenter.

11. The server of claim 9, wherein the stability analysis module is further configured to determine the stability parameter based on one or more of a Routh-Hurwitz stability criterion, a Nyquist stability criterion, and a root locus analysis.

12. The server of claim 9, wherein the stability analysis module is further configured to compare the stability parameter to a predefined threshold.

13. The server of claim 9, wherein the stability analysis module is further configured to determine the stability parameter based on Fourier extraction.

14. The server of claim 9, wherein the processing module is further configured to offer an application programming interface (API) for determining whether another automation feedback loop conflicts with the deployment.

15. A cloud-based datacenter configured to stabilize feedback loops in a multi-entity deployment, the datacenter comprising:
   at least one virtual machine (VM) operable to be executed on one or more physical machines, and a datacenter controller configured to:
　　receive a first metric from a first portion of a deployment executing on the VM;
　　receive a second metric from another entity executing a second portion of the deployment;
　　generate a synthetic generalized model of the deployment;
　　use the model to determine a first model metric corresponding to the first metric;
　　use the model to determine a second model metric corresponding to the second metric;
　　compare the first model metric with the first metric and the second model metric with the second metric;
　　update the model based on the comparison;
　　determine, based on the model, a stability parameter of the deployment associated with an interaction between the VM and the other entity, wherein the stability parameter includes one or more of an oscillation frequency and an oscillation amplitude of a deployment parameter; and
　　one or more of: provide an alert and adjust the deployment based on the stability parameter.

16. The datacenter of claim 15, wherein the datacenter controller is further configured to determine the at east one stability parameter based on one or more of a Routh-Hurwitz stability criterion, a Nyquist stability criterion, and a root locus analysis.

17. The datacenter of claim 15, wherein the datacenter controller may be further configured to compare the stability parameter to a predefined threshold.

18. The datacenter of claim 15, wherein the deployment parameter includes one or more of a load on the VM, a load on the other entity, a performance of the VM, and a performance of the other entity.

19. The datacenter of claim 15, wherein the datacenter controller is further configured to adjust the deployment based on the stability parameter by adjusting one or more of:
　　a time period for automation feedback,
　　a magnitude for automation feedback,
　　a timing dithering for automation feedback,
　　a load distribution for the VM and the other entity,
　　an amount of work to be sent to the VM, and
　　an amount of work to be sent to the other entity.

20. The datacenter of claim 15, wherein the datacenter controller is further configured to offer an application programming interface (API) for determining whether another automation feedback loop conflicts with the deployment.

* * * * *